(12) United States Patent
Noba

(10) Patent No.: US 7,862,185 B2
(45) Date of Patent: Jan. 4, 2011

(54) MOBILE PHONE

(75) Inventor: Koya Noba, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 920 days.

(21) Appl. No.: 11/731,804

(22) Filed: Mar. 30, 2007

(65) Prior Publication Data

US 2008/0014995 A1    Jan. 17, 2008

(30) Foreign Application Priority Data

Mar. 30, 2006   (JP) .............................. 2006-092672
Dec. 26, 2006   (JP) .............................. 2006-349718

(51) Int. Cl.
*G03B 21/14*   (2006.01)

(52) U.S. Cl. ............................ 353/119; 353/39; 353/46; 353/100; 353/101; 353/122; 348/14.01; 348/14.16; 348/373; 348/376; 348/744; 348/789; 348/836; 348/838; 349/5; 349/7; 349/8; 349/16; 455/550.1; 455/556.1; 455/575.1; 455/899; 359/204.1; 359/205.1

(58) Field of Classification Search .................... 353/39, 353/46, 119, 122, 100, 101; 359/204.1, 205.1; 348/14.01, 455, 556.1, 744, 789, 836, 838, 348/14.16, 373, 376; 455/550.1, 556.1, 566, 455/575.1, 573.3, 899; 349/5, 7, 8, 16
See application file for complete search history.

(56) References Cited

U.S. PATENT DOCUMENTS

| | | | |
|---|---|---|---|
| 5,751,383 A | 5/1998 | Yamanaka | |
| 6,489,934 B1 * | 12/2002 | Klausner | 345/1.1 |
| 6,547,400 B1 | 4/2003 | Yokoyama | |
| 6,773,114 B2 * | 8/2004 | Pienimaa et al. | 353/71 |
| 7,458,692 B2 * | 12/2008 | Nagatsuka et al. | 353/101 |
| 7,720,436 B2 * | 5/2010 | Hamynen et al. | 455/13.1 |

(Continued)

FOREIGN PATENT DOCUMENTS

JP    7-58814 A    3/1995

(Continued)

OTHER PUBLICATIONS

Noba, U.S. Patent Application entitled "Mobile Phone", U.S. Appl. No. 11/801,485, filed May 10, 2007.

(Continued)

*Primary Examiner*—Georgia Y Epps
*Assistant Examiner*—Sultan Chowdhury
(74) *Attorney, Agent, or Firm*—Brinks Hofer Gilson & Lione

(57) ABSTRACT

A casing 20 of a mobile phone body is provided with a sub-liquid-crystal display panel 23, a projector lens 26, a light source 35 including an LED. The sub-liquid-crystal display panel 23 and the projector lens 26 are movable between a normal position contained within the casing 20 and a raised position raised from the normal position. The sub-liquid-crystal display panel 23 is fixed at the raised position roughly perpendicularly to the light axis Q between the-sub-liquid-crystal display panel 23 and the light source 35 so that the light axis of the projector lens 26 is substantially aligned with the light axis Q. The illumination light from the light source is set to be parallel rays.

27 Claims, 13 Drawing Sheets

U.S. PATENT DOCUMENTS

2002/0063855 A1* 5/2002 Williams .................... 353/122
2006/0209374 A1* 9/2006 Willemsen .................. 359/205
2008/0259289 A1* 10/2008 Nozaki et al. ................. 353/70
2009/0051832 A1* 2/2009 Banks et al. ................... 349/7

FOREIGN PATENT DOCUMENTS

| JP | 2001-313702 A | * | 11/2001 |
| JP | 2004-317871 | | 11/2004 |
| JP | 2004-317871 A | * | 11/2004 |
| JP | 2005-191838 | | 7/2005 |
| WO | WO2006/013522 A2 | | 2/2006 |

OTHER PUBLICATIONS

Japanese Office Action issued Mar. 26, 2010 for Japanese Application No. 2006-092672 with translation (1 page).

* cited by examiner

Fig. 25 (Amended)
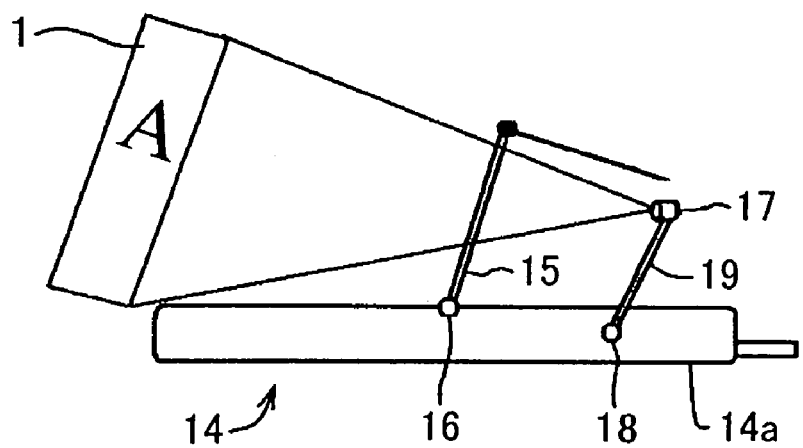

Fig. 26 (Amended)
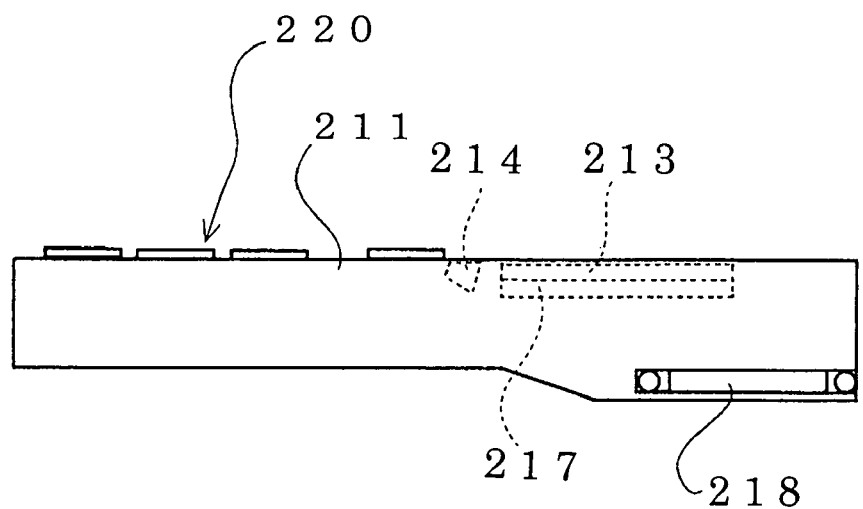

MOBILE PHONE

This application Claims priority under 35 U.S.C. §119 to Japanese Patent Application Nos. JP2006-092672 filed Mar. 30, 2006 and JP2006-349718 filed Dec. 26, 2006, the entire content of which is hereby incorporated by reference.

BACKGROUND OF THE INVENTION

The present invention relates to mobile phones, and in particular relates to a mobile phone having an image projection function.

DESCRIPTION OF PRIOR ART

Recently, a mobile phone having an image projection function has been developed.

For example, Japanese Unexamined Patent Application Publication No. H07-58814 discloses a mobile phone, as shown in FIGS. 11 and 12, having an image projection function. The mobile phone 5 is designed to have an image projection unit 8 provided at a lower portion of a phone body 6 via an angle adjusting unit 7.

The phone body 6 includes a phone-receiver unit 9, a phone-transmitter unit 10 and a key pad 11 as well as a display 12 for displaying information such as an incoming E-mail.

The projection unit 8 includes an optical system for projecting images formed by an image processor (not shown) disposed in the phone body 6, wherein images are projected outside through a projector lens 14 (see FIG. 12) positioned at the bottom of the projection unit 8.

Digital signals of sounds and images received by an antenna 13 are inputted into an arithmetic processor (not shown), to which a sound processor and the image processor are connected. To the image processor, the image projection unit 8 is connected. The image processor forms images based on the inputted signals and the images are projected outside through the projector lens 14.

However, in this mobile phone, the image projection unit 8 is additionally provided at the lower portion of the phone body 6, so that the length of the phone is elongated. Further, since the image projection unit 8 accommodates a light valve such as a liquid crystal panel with a light source and a projector lens, the thickness of the image projection unit 8 becomes larger, thus deteriorating the portability of the mobile phone.

Japanese Unexamined Patent Application Publication No. 2004-317871 discloses a mobile phone having an image projection mechanism as shown in FIG. 25. In this mobile phone 14, when images are projected, a light-transmissive liquid crystal display panel 15 laid on the surface of a body case 14a and a lamp 17 disposed in the body case 14a are, as shown, rotatably moved about a shaft 16 and a shaft 18, respectively, to be raised above the body case 14a, whereby images displayed on the liquid crystal display panel can be projected on a screen 1.

However, the image projection unit does not adopt a projector lens and, therefore, the projected images may appear blurred. Further, the light beam from the lamp 17 spreads at a wide angle, so that the projected images are increased in area and, thus, decreased in brightness. Even if the projector lens is adopted, the lens must be large in size to receive the spread light from the lamp 17. Furthermore, a mobile phone generally has a liquid crystal display panel with color filters and, therefore the light transmittance of the display panel is several percents, so that it is difficult to form visible projected images with electric power sources generally used for mobile phones.

Further, since the liquid crystal display panel and the projection lamp are arranged as shown in FIG. 25, it will be tricky for a user to operate the operation panel while using the image projection function.

BRIEF SUMMARY OF THE INVENTION

Accordingly, it is an object of the present invention to solve the problems mentioned above in a conventional mobile phone having an image projection function.

According to one aspect of the present invention, there is provided a mobile phone that includes a mobile phone body and image projecting means provided in the mobile phone body. The image projecting means includes a light-transmissive liquid crystal display panel movably attached to the mobile phone body and movable to a raised position where the light-transmissive liquid crystal display panel is raised from the mobile phone body, a light source for emitting light to illuminate the light-transmissive liquid crystal display panel located at the raised position, and a projector lens positioned to oppose a display surface of the light-transmissive liquid crystal display panel located at the raised position so as to perform image projection by letting the light emitted from the light source and having passed through the light-transmissive liquid crystal display panel pass through the projector lens.

This mobile phone is capable of projecting clear images, while maintaining portability and operability of a normal mobile phone. Namely, the light-transmissive liquid crystal display panel is located at the raised position only when image projection is performed. The mobile phone will therefore be used in a normal operation thereof without any inconvenience which may be caused by the image projecting means. In an image projection operation, the projector lens make the images clear.

Specifically, the projector lens may be arranged so that its light axis is substantially perpendicular to the display surface of the light-transmissive liquid crystal display panel located at the raised position.

By doing so, the modulation of the light passing through the light-transmissive liquid crystal display panel is made uniform, enabling the projected images to be clear.

In the mobile phone, the light source may be arranged so that its light axis is substantially perpendicularly to the display surface of the light-transmissive liquid crystal display panel located at the raised position.

By doing so, the distortion of the projected images is reduced, enabling the projected images to be clear.

In the mobile phone, the projector lens and the light source may be movably attached to the mobile phone body so that the projector lens and the light source are movable to raised positions wherein the projector lens and the light source are raised from the mobile phone body, respectively, in such a manner that the light axes of the projector lens and the light source located at the raised positions are substantially aligned with each other, whereby clear images are formed without distortion thereof.

Furthermore, in the mobile phone, the projector lens may be movable between a normal position in that the projector lens is displaced within the contour of the mobile phone and a raised position in that the projector lens opposes the light-transmissive liquid crystal display panel located at the raised position. Since the projector lens as well as the light-transmissive liquid crystal display panel is movable as noted above, the mobile phone can enjoy portability and operability as a normal mobile phone while having capability of projecting clear images.

In the mobile phone, the projector lens may be detachably attached to the mobile phone body. Specifically, the projector lens can be located at the raised position opposing the light-transmissive liquid crystal display panel only when images are projected. In a normal operation or when the image projection is not performed, the projector lens can be located at a position where the lens is accommodated in the mobile phone body. The projector lens may also be placed separately from the mobile phone body. In such a case, for example, even when the thickness of the projector lens becomes comparatively larger by composing the projector lens with a plurality of lenses in order to have a focusing function and a field-angle adjusting function, the size of the mobile phone body can be kept normal and thus maintain the portability and operability.

In the mobile phone, preferably, the light source comprises at least one light-emitting diode. The light-emitting diode is small in size and can emit strong light with small electric power, enabling the projected images to be clear.

In this case, the light-emitting diode may be composed of a red-color light-emitting diode, a green-color light-emitting diode, and a blue-color light-emitting diode, so that full-color images can be projected. Furthermore, in this case, the light-emitting diode may be in the shape of a package containing a red-color light-emitting diode element, a green-color light-emitting diode element, and a blue-color light-emitting diode element.

More specifically, the light source may be composed of at least one light-emitting diode and red-color light, green-color light, and blue-color light are sequentially emitted from the light-emitting diode. Synchronously, the light-transmissive liquid crystal display panel is operated so as to project multi-color images from the display surface of the light-transmissive liquid crystal display panel.

Preferably, electric driving power for the light source is supplied from a mobile phone battery charger. The image projecting means can be driven with electric power higher than that for normal operation of the mobile phone, enabling the clear images to be projected for a long time. In this case, the mobile phone body may be detachably mountable on the mobile phone battery charger.

In the mobile phone, preferably, the light-transmissive liquid crystal display panel is movable to a normal position where it is used to display an information in a normal operation of the mobile phone. That is, the light-transmissive liquid crystal display panel can be used for both purposes of displaying information during the normal operation and projecting images.

In the mobile phone, preferably, the mobile phone body comprises a first casing having first and second opposite surfaces. The light-transmissive liquid crystal display panel is provided in the first casing to be movable between a normal position where it is displaced within the contour of the first casing and a raised position where it is raised from the first surface at a predetermined angle. The projector lens is also attached on the first surface of the first casing so that the light axis of the projector lens is normal to the display surface of the light-transmissive liquid crystal display panel located at the raised position.

Specifically, the projector lens is movable between a normal position where the projector lens is held in parallel with the first surface within the contour of the first casing and a raised position wherein the projector lens is raised from the first surface at a predetermined angle.

Preferably, the light source is located at a position spaced apart from the light-transmissive liquid crystal display panel on the light axis of the light source. Alternatively, the light source may be positioned on a side of the light-transmissive liquid crystal display panel opposite to a side of the same on which the display surface thereof is located and include an LED, a prism sheet, and a reflective polarizing plate, which are disposed successively in a direction toward the light-transmissive liquid crystal display panel along the light axis of the projector lens. Further, the light source may be in contact with and combined with the light-transmissive liquid crystal display panel to form a light source/display panel unit. Since the LED is a small-sized component and both the prism sheet and the reflective polarizing plate are thin sheets, the light source/display panel unit can be reduced in thickness as a whole, thereby reducing the image projecting means in size. In this case, the LED light is increased in parallelism by the prism sheet and enters the reflective polarizing plate. The reflective polarizing plate transmits polarized components to be used in the light-transmissive liquid crystal display panel while reflecting the other polarized components for reuse. By such a prism sheet and a reflective polarizing plate, the light-transmissive liquid crystal display panel can be efficiently illuminated with the light emitted from the LED. Thereby, projected images bright enough for visible can be obtained with high light economic efficiency.

Alternatively, the light source may be positioned on a side of the light-transmissive liquid crystal display panel opposite to a side of the same on which the display surface is located. The light source includes a light guide plate, a prism sheet, and a reflective polarizing plate, which are disposed successively in a direction toward the light-transmissive liquid crystal display panel along the light axis of the projector lens. The light source further comprises a LED positioned adjacent to a periphery of the light guide plate. The light source is placed in contact with and combined with the light-transmissive liquid crystal display panel to form a light source/display panel unit. By providing the light guide plate, the incident angle of the light emitted from the LED and entering into the prism sheet is optimized, so that more bright projected images can be obtained. By providing the light guide plate, the liquid crystal display unit may also be reduced in thickness, thereby reducing the mobile phone in thickness.

Specifically, the liquid crystal display unit is movable between a normal position where it is held within the contour of the first casing and a raised position where it is raised from the first surface at a predetermined angle.

Preferably, the mobile phone body may comprise first and second casings connected together with a hinge. The first casing has first and second opposite surfaces. The first casing is pivotable between a folded position where the second surface of the first casing is in contact with a surface of the second casing and an unfolded position where the first casing is pivotably moved relative to the second casing to extend in a longitudinal direction of the second casing. The second casing has an end positioned adjacent to the hinge, and the light source is disposed on the end so as to illuminate the light-transmissive liquid crystal display panel located at the raised position with light having a light axis extending perpendicular to the light-transmissive liquid crystal display panel located at the raised position on the first surface of the first casing located at the unfolded position. In brief, the mobile phone body is made foldable and, in an image projection operation, the mobile phone body is unfolded to be the extended state.

Alternatively, the mobile phone body may comprises a first casing having first and second opposite surfaces, and the first casing is provided on the second surface with a main liquid crystal display panel for displaying information about the mobile phone, and on the first surface with the light-transmissive liquid crystal display panel and the projector lens. In this case, the mobile phone body may be foldable or not.

Alternatively, the mobile phone body may comprise first casing having first and second opposite surfaces and second casing connected to the first casing with a hinge. The first casing is pivotable between a folded position where the second surface of the first casing is in contact with a surface of the second casing and an unfolded position where the first casing is pivotably moved relative to the second casing to extend in a longitudinal direction of the second casing. The first casing is provided with a main liquid crystal display panel on the second surface for displaying information about the mobile phone, and a sub liquid crystal display panel for displaying information about the mobile phone on the first surface. The second casing is provided with an operation panel on the surface that the second surface of the first casing is brought into contact with when the first casing is located at the folded position. The sub liquid crystal display panel serves as the light-transmissive liquid crystal display panel of the image projecting means.

In the mobile phone, preferably, the light emitted from the light source may be a collimated light and substantially perpendicularly enters the display surface of the light-transmissive liquid crystal display panel from a side thereof opposite to the display surface of the light-transmissive liquid crystal display panel.

The present invention also provides a mobile phone that includes a mobile phone body and image projecting means provided in the mobile phone body. The image projecting means includes a light-transmissive liquid crystal display panel attached to the mobile phone body and a projector lens positioned to oppose a display surface of the light-transmissive liquid crystal display panel so as to perform an image projection by letting the light emitted from the light source and having passed through the light-transmissive liquid crystal display panel pass through the projector lens. The projector lens is detachably mountable on the mobile phone body and comprising a plurality of lenses for enabling at least one of a focusing function and a field-angle adjusting function.

In the mobile phone, in order to form the image projecting means, the light-transmissive type is adopted as the liquid crystal display panel of the mobile phone and the projector lens is set relative to the liquid crystal display panel as described above.

BRIEF DESCRIPTION OF SEVERAL VIEWS OF THE DRAWINGS

FIG. 25 is a side view of another conventional mobile phone having an image projection mechanism;

FIG. 26 is a side view of a mobile phone according to a sixth embodiment of the present invention in a normal state.

DETAILED DESCRIPTION OF THE INVENTION

Embodiments of the present invention will be described below with reference to the attached drawings.

FIGS. 1 to 4 show a mobile phone 40 according to a first embodiment of the present invention.

Figure 1:
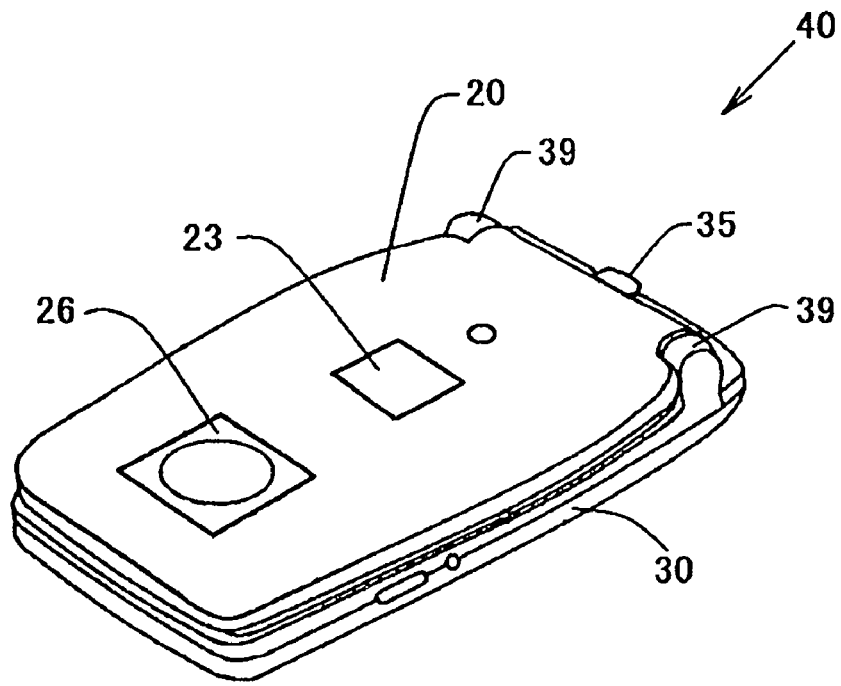
FIG. 1 is a perspective view of a mobile phone according to a first embodiment of the present invention which is in a folded state.
Figure 2:
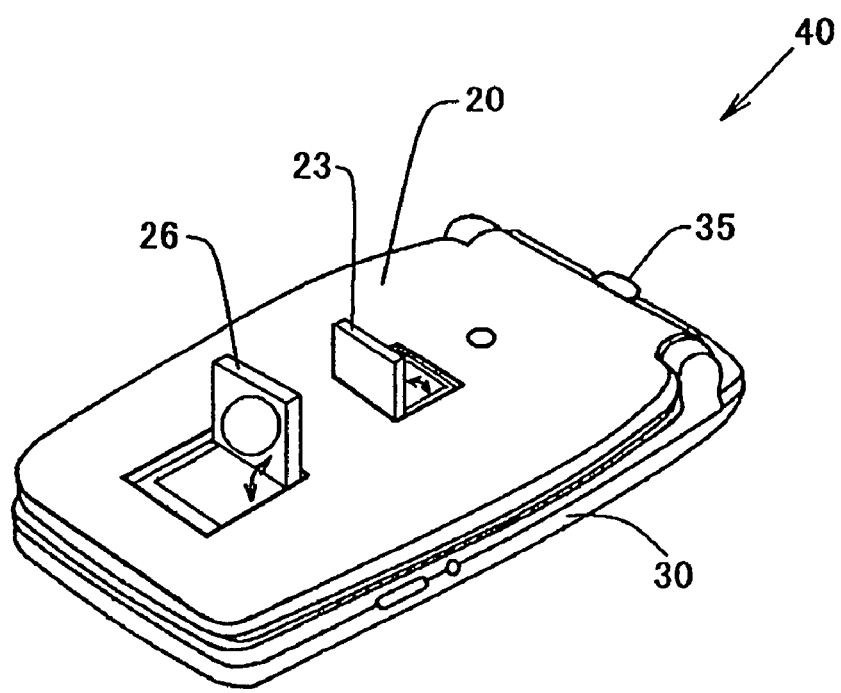
FIG. 2 is a perspective view of the mobile phone of FIG. 1, showing a state in that a light-transmissive liquid crystal display panel and a projector lens are raised.
Figure 3:
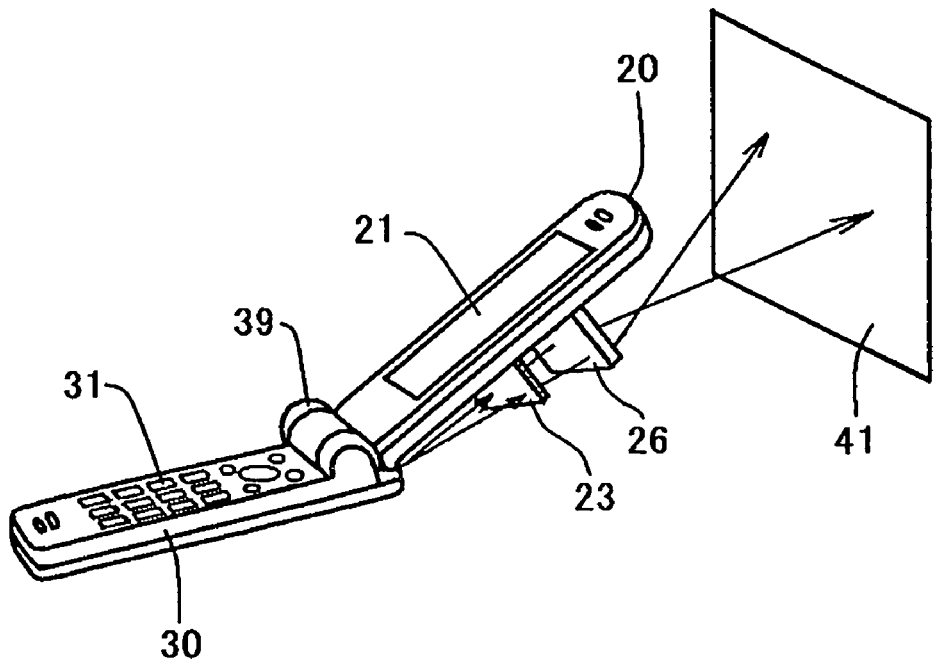
FIG. 3 is a perspective view of the mobile phone of FIG. 1, schematically showing a state where image projection is performed with the mobile phone.

As shown in FIGS. 1 and 2, the mobile phone 40 is a foldable mobile phone in that a first casing 20 and a second casing 30 are connected together via a hinge 39 to enable the phone to be unfolded and folded. In an unfolded state of the mobile phone 40 (FIG. 3), a main liquid crystal display panel 21 and an operation panel 31 appear on the first casing 20 and the second casing 30, respectively. On the main liquid crystal display panel 21, various kinds of information about the mobile phone, such as received information, are displayed. By using the operation panel 31, various operation such as message sending/receiving operation and picture switching operation are performed. At an end face of the second casing 30 in the vicinity of the hinge 39, a light source 35 composed of an LED is provided.

The first casing 20 is provided with a light-transmissive sub-liquid-crystal display panel 23 and a projector lens 26 on a side thereof opposite to a side on which the main liquid-crystal display panel 21 is provided so that the light-transmissive sub-liquid-crystal display panel 23 and the projector lens 26 are movable between the normal position shown in FIG. 1 and the raised position shown in FIG. 2. The sub-liquid-crystal display panel 23 and the projector lens 26 located at the raised position are fixed at a predetermined angle to the surface of the first casing 20.

The light source 35 is located on a straight line extending through the sub-liquid-crystal display panel 23 and the projector lens 26 which are at the raised position on the first casing 20, i.e., and the optical axis of the projector lens 26. Light emitted from the light source 35 thereby passes through the sub-liquid-crystal display panel 23 (i.e., the image on the sub-liquid-crystal display panel 23) and the projector lens 26 so that the image enlarged by the projector lens 26 is projected on a screen.

When the picture is not projected, the sub-liquid-crystal display panel 23 and the projector lens 26 are returned to the normal position shown in FIG. 1.

The raising and returning of the sub-liquid-crystal display panel 23 and the projector lens 26 are operated by a switch (not shown).

On the sub-liquid-crystal display panel 23, various kinds of information are displayed, such as the other end's telephone number and name and a call receipt. According to the embodiment, on the sub-liquid-crystal display panel 23, the same images as those of the main liquid-crystal display panel 21 may be displayed.

The projector lens 26 comprises a convex lens accommodated within a case, and in the raised state, it is movable in the longitudinal direction of the first casing 20 within a minute range for focusing of the projected images.

According to the embodiment, one convex lens with a diameter of about 20 mm and a thickness of about 5 mm is used, so that an image with a diagonal of 350 mm can be formed on a screen when the sub-liquid-crystal display panel 23 with a diagonal of about 15 mm is used. The lens with such a size can be sufficiently installed within the first casing 20.

Figure 4:
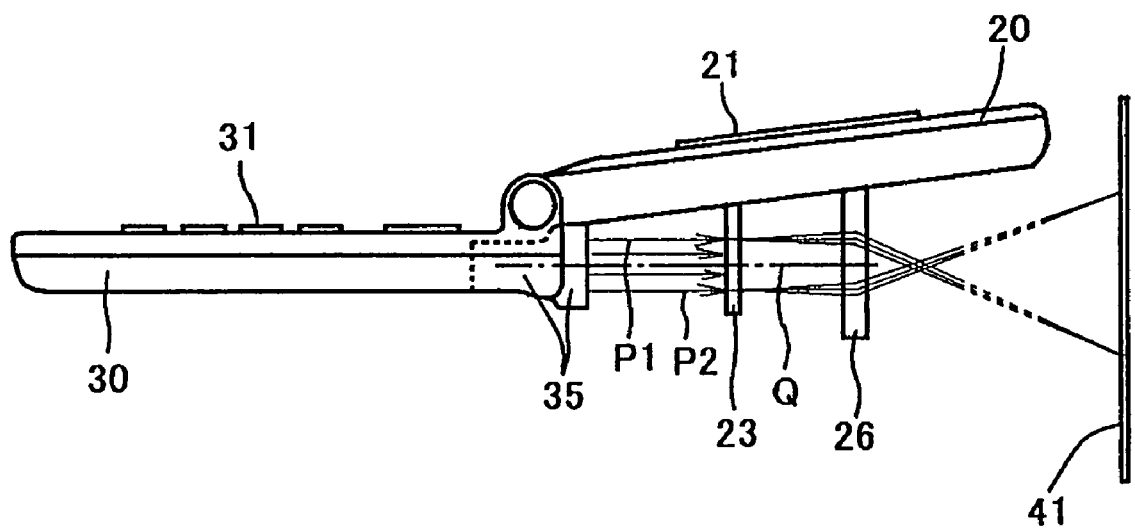
FIG. 4 is an explanatory view of the mobile phone shown in FIG. 1, illustrating the positional relationship between a light beam from a light source, the light-transmissive liquid crystal display panel, and the projector lens.
Figure 5:
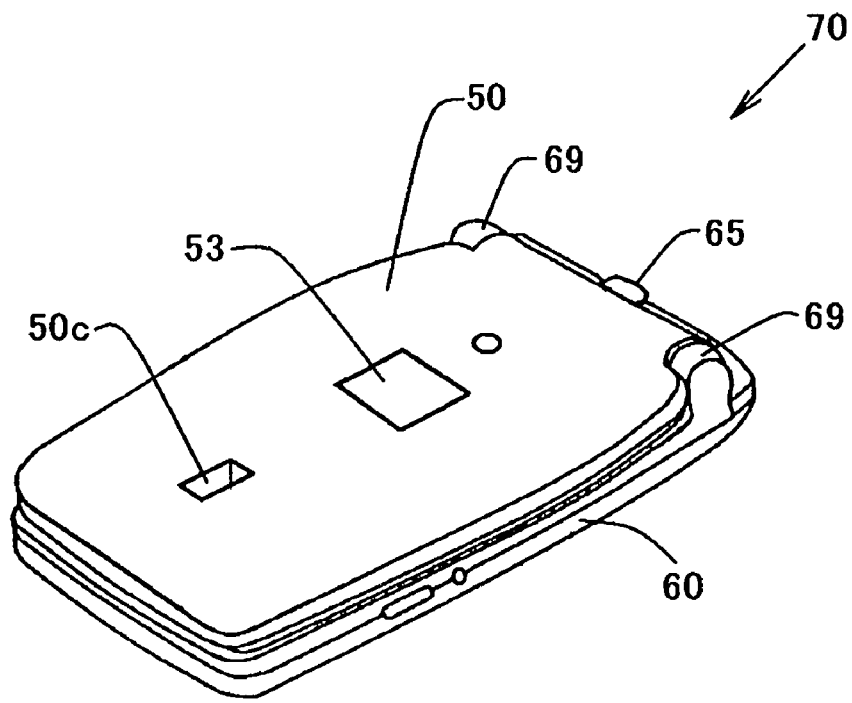
FIG. 5 is a perspective view of a mobile phone according to a second embodiment of the present invention which is in a folded state.

The light source 35 is composed of an LED and condensing means for substantially collimating the light from the LED and directing it toward the sub-liquid-crystal display panel 23. That is, the light emitted from the LED is substantially collimated as denoted by P1 and P2 in FIG. 3 and directed to the sub-liquid-crystal display panel 23. As shown in FIG. 4, the light rays P1 and P2 from the light source 35 are made substantially parallel with the light axis Q (denoted by a chain line) of the light source extending between the light source 35 and the sub-liquid-crystal panel 23. Accordingly, the dispersion of the light emitted from the light source 35 is reduced, so that the brightness of the projected images is increased. Also, since the diffusion of the light from the sub-liquid-crystal display panel 23 is reduced, the projector lens 26 can be of small diameter and, thus, the space for accommodating the lens in the mobile phone body is reduced. The light source 35 can efficiently perform the illumination function with a compact size.

In the illustrated embodiment, the display surface of the sub-liquid-crystal display panel 23 is oriented to be substantially perpendicular to the light axis Q extending between the light source 35 and the sub-liquid-crystal display panel 23, and the projector lens 26 is arranged so that its light axis is directed to be almost normal to the display surface of the sub-liquid-crystal display panel 23. It is preferable that the light axis between the light source 35 and the sub-liquid-crystal display surface 23 and the light axis between the display surface of the sub-liquid-crystal display panel 23 and the projector lens 26 are substantially aligned with each other. By arranging the sub-liquid-crystal display panel 23 to be almost perpendicular to the light axis of the light source 35, unevenness in the modulation of the light effected by the sub-liquid-crystal display panel 23 is suppressed so that the projected image is almost equal in shape to the image on the sub-liquid-crystal display panel 23. By making the light axis Q of the projector lens 26 substantially aligned with the light axis of the light source 35, a bright enlarged projected image with the same shape as that of the sub-liquid-crystal display panel 23 can be obtained without distortion. Further, in combination with the effect that the emitted light from the light source 35 is collimated, the images are made brighter.

By making the light axis Q of the projector lens 26 substantially aligned with that of the light source 35, the center of the projected images is positioned on the extension line of the light axis of the light source 35. However, the projected image light may be blocked by the first casing 20 due to the size thereof, the position of the projector lens 26 and/or the distance between the projector lens 26 and the screen. In such a case, by displacing slightly downward the light axis of the projector lens 26 while keeping a desired performance of the projector lens 26, the images can be projected without the blockage. Namely, the center of the projected images is positioned below the extension line of the light axis Q. In this application, the wording "the light axis Q of the projector lens 26 is aligned with the light axis of the light source 35" or the like should be understood as including the case wherein the light axis of the projector lens is displaced as stated above.

According to the first embodiment, the LED with a total luminous flux of about 50 lm (lumen) is used for the light source 35; the sub-liquid-crystal display panel 23 has a display surface with a diagonal of about 15 mm; and the projector lens 26 has a lens with a diameter of about 20 mm and a thickness of about 5 mm, so that an image with a diagonal of 350 mm can be projected on a screen 41. The illuminance of the projected light is about 100 lx (lux), so that the projected image is visible in a room at daytime when indoor lighting is turned off.

The mobile phone 40 having the configuration stated above can have an image projection function with the brightness sufficient for being visible. When the image projection function is not used, the sub-liquid-crystal display panel 23 and the projector lens 26 are placed at the normal positions (FIG. 1) so as to make the mobile phone 40 generally equal in size to a mobile phone without the image projection function and, thus, the portability thereof can be preferably obtained. In comparison with conventional mobile phones with the image projection function as described in the background art, the mobile phone in accordance with the present invention is compact, thereby improving the portability.

In an image projection operation, a user can operate the operation panel 31 by his hand holding the mobile phone 40 while viewing the main liquid-crystal display panel 21 and the operation panel 31. It is therefore easy for the user to perform, for example, switching of the images.

According to the first embodiment, the projector lens 26 is mounted on the first casing 20 in an exposed state. A protection cover may be provided for protecting the projector lens 26 in order to prevent the lens from being damaged during carrying or due to an impact. The image projection is performed with the protection cover removed.

FIGS. 5 to 8 show a mobile phone 70 according to a second embodiment of the present invention.

As is in the first embodiment, the mobile phone 70 is foldable wherein a first casing 50 and a second casing 60 are connected together via a hinge 69.

Figure 6:
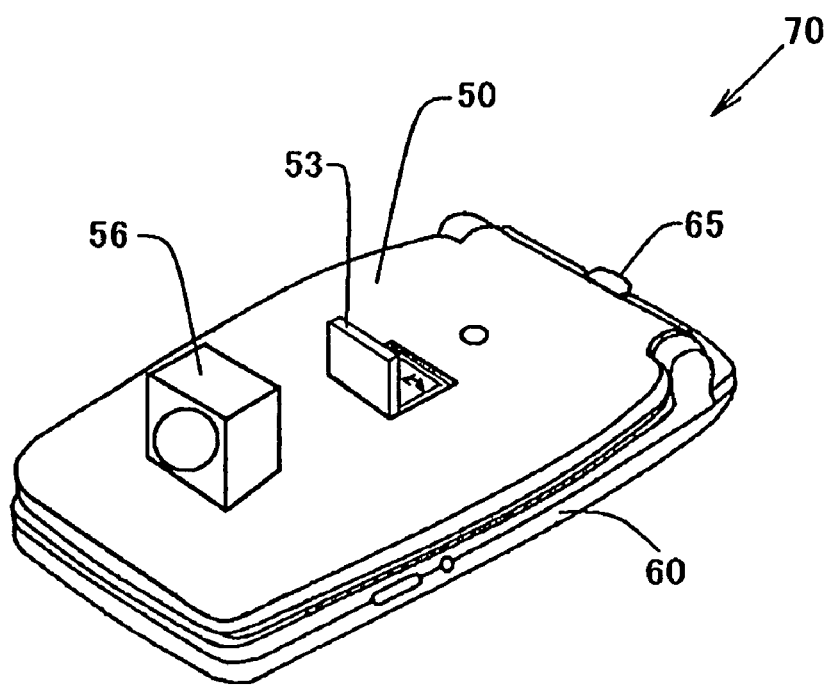
FIG. 6 is a perspective view of the mobile phone of FIG. 5, showing a state in that a light-transmissive liquid crystal display panel is raised and a projector lens is mounted.

The first casing 50 is provided with a light-transmissive liquid-crystal display panel 53, which is arranged on a side of the first casing opposite to a side on which a main liquid-crystal display panel is provided. The light-transmissive liquid-crystal display panel is movable between the normal position (FIG. 5) and the raised position (FIG. 6). According to the second embodiment, the first casing 50 is provided with a mounting hole 50*c* for detachably fixing a projector lens 56. The mounting hole 50*c* is adapted to receive a projection 56*c* of a case 56*b* of the projector lens 56. By inserting the projection 56*c* into the mounting hole 50*c*, the projector lens 56 is fixed to the first casing 50, as shown in FIG. 6.

Figure 7:
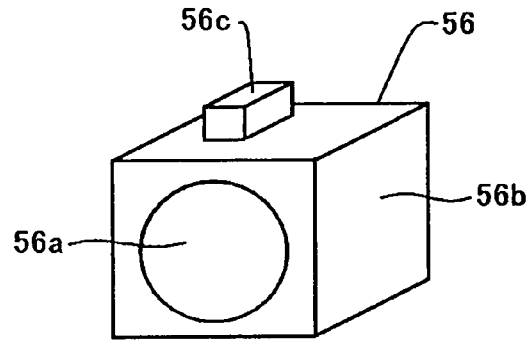
FIG. 7 is a perspective view of the projector lens of the mobile phone of FIG. 6.
Figure 8:
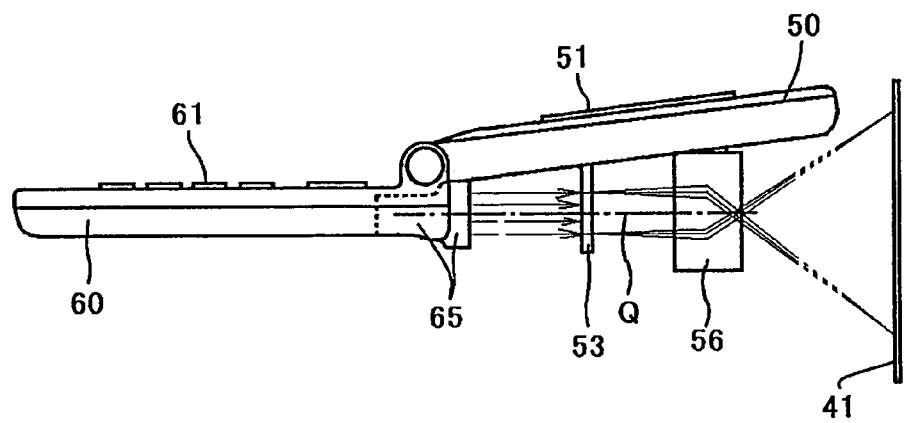
FIG. 8 is an explanatory view of the mobile phone of FIG. 5, illustrating the positional relationship between a light beam from a light source, the transmissive liquid crystal display panel, and the projector lens.

The projector lens 56, as shown in FIG. 7, is composed of a plurality of lenses 56*a* arranged within the case 56*b*. Although not shown, in the case 56*b*, all or some of the plurality of lenses 56*a* are movable along the light axial thereof within a minute range. By moving the lenses 56*a* within the case 56*b*, the projected images can be adjusted in size and focus. The reason why the projector lens 56 uses a plurality of lenses is to improve quality of the projected images. When a plurality of lenses are used, the thickness of the projector lens 56 is increased. The projector lens 56 is therefore prepared separately from the first casing 50 and designed to be detachably mounted on the first casing 50.

The second casing 60 is provided with a light source 65 at one end thereof in the vicinity of the hinge 69. Like the first embodiment, the light source 65 includes an LED and condensing means for converting the light from the LED into a collimated light to project images displayed on the light-transmissive sub-liquid-crystal display panel 53 in the same manner as in the first embodiment.

When images are not projected, the projector lens 56 is removed and the light-transmissive liquid-crystal display panel 53 is returned to the original flat position.

The shape of the mounting hole 50*c* is not limited to the illustrated one and may be, for example, in the shape of "L". It is preferable that the mounting hole 50*c* be provided with a cover for preventing dust from entering the mounting hole.

Figure 9:
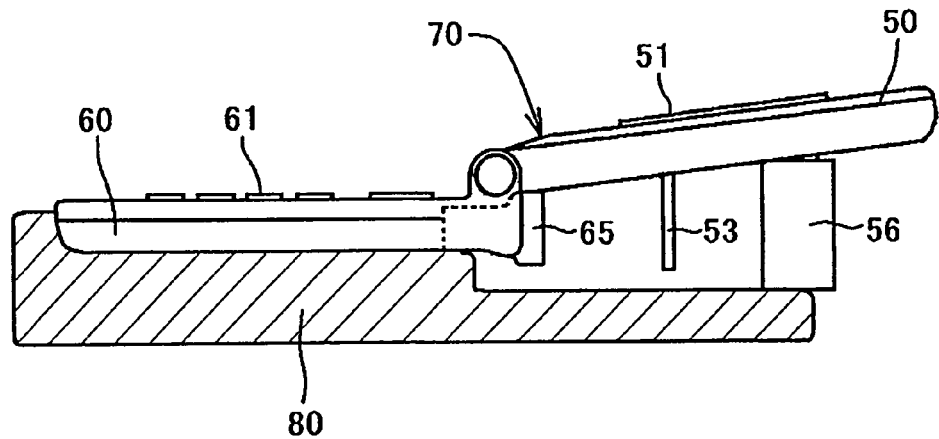
FIG. 9 is a side view of the mobile phone of FIG. 5 mounted on a mobile-phone battery charger shown with hatching.
Figure 10:
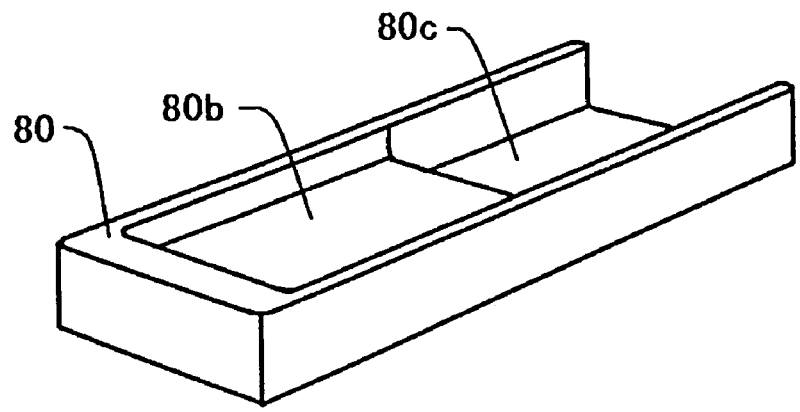
FIG. 10 is a perspective view of the mobile-phone battery charger shown in FIG. 9.
Figure 11:
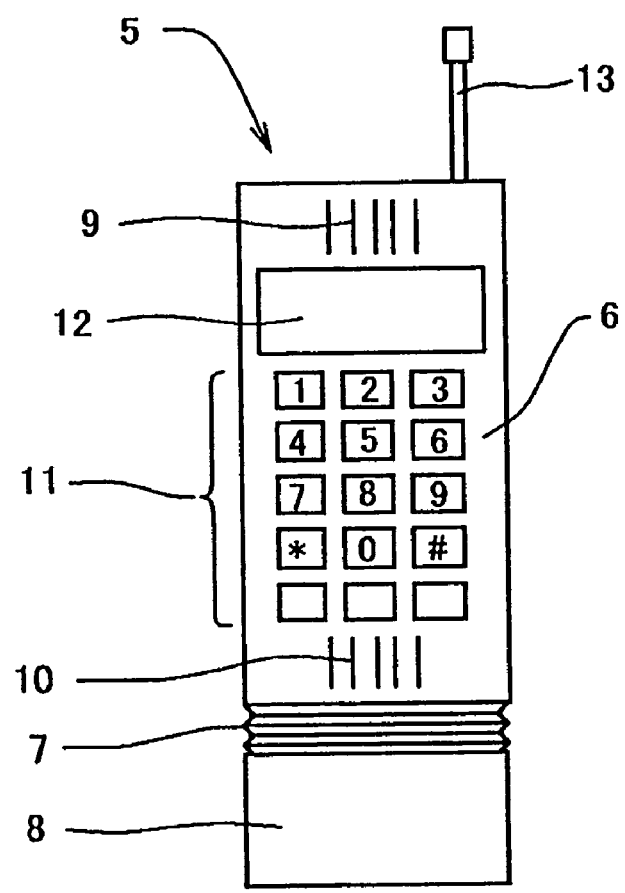
FIG. 11 is a plan view of a conventional mobile phone.
Figure 12:
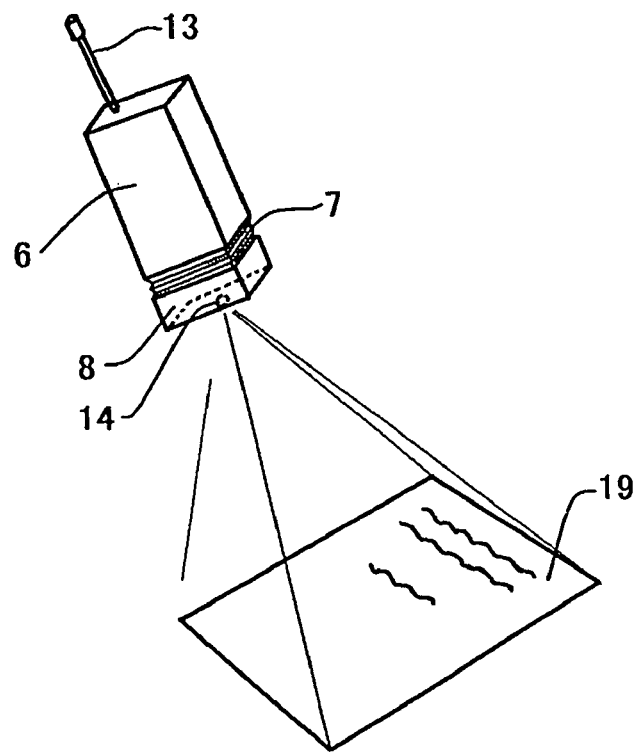
FIG. 12 is a perspective view of the mobile phone of FIG. 11, showing a state in that the image projection is being performed by the mobile phone.
Figure 13:
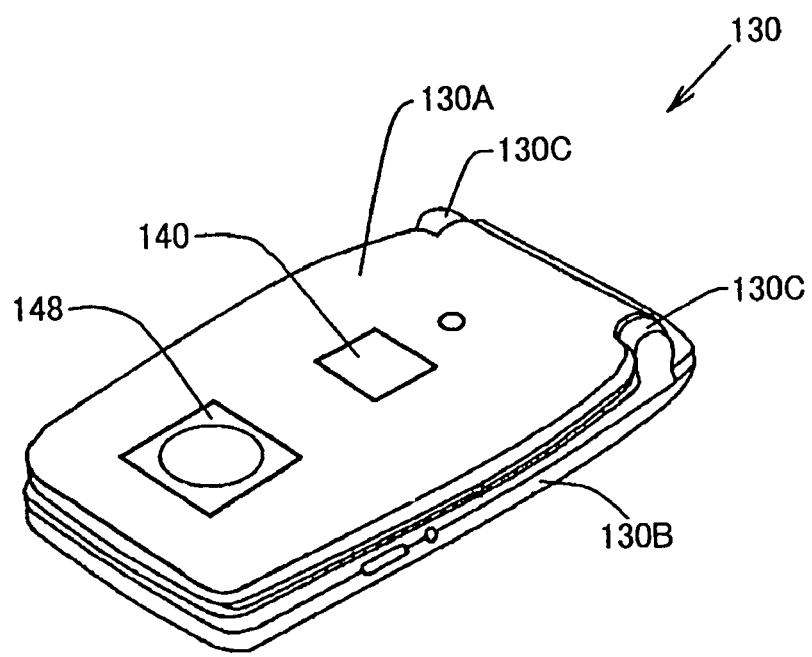
FIG. 13 is a perspective view of a mobile phone according to a third embodiment of the present invention which is in a folded state.

FIGS. 9 and 10 show a battery charger 80 for the mobile phone according to the second embodiment. FIG. 9 shows a state that the mobile phone 70 is unfolded and mounted on the battery charger 80. The battery charger 80 supplies an electric power to the mobile phone body via power-supply terminals arranged in the second casing 60. The power supplied by the battery charger 60 enables a long time image projection. Further, although if a projected image area is increased, the brightness of the image varies in inverse proportion to the area, the power supplied by the battery charger 80 enables the enlarged image to be sufficiently bright.

The battery charger 80 is, as shown in FIG. 10, configured to have a recess 80*b* and a recess 80*c*. When the mobile phone is mounted on the battery charger, the recess 80*b* receives and securely holds the second casing 60 of the mobile phone body and the recess 80*c* accommodates the light-transmissive liquid-crystal display panel 53 and the projector lens 56. The depth and width of the recess 80*c* are designed not to block the light directed toward a screen.

Recently, some mobile phones are adapted to be connected to personal computers and/or to receive television broadcasting. In the embodiment shown in FIG. 9, large electric power can be supplied to the LED of the mobile phone from the charger, whereby the images to be displayed on the personal computer or the television can be projected by using the image projection function of the mobile phone with an external large projector lens attached to the mobile phone.

FIGS. 13 to 16 show a mobile phone 130 according to a third embodiment of the present invention.

The mobile phone 130 is generally the same in structure as the mobile phone 40 according to the first embodiment, and includes first and second casings 130A and 130B connected together via a hinge 130C, a liquid crystal display unit 140, and a projector lens 148, which are substantially the same in fundamental function as those in the first embodiment. Hence, only the features peculiar to the third embodiment will be described herein and others are omitted.

Figure 14:
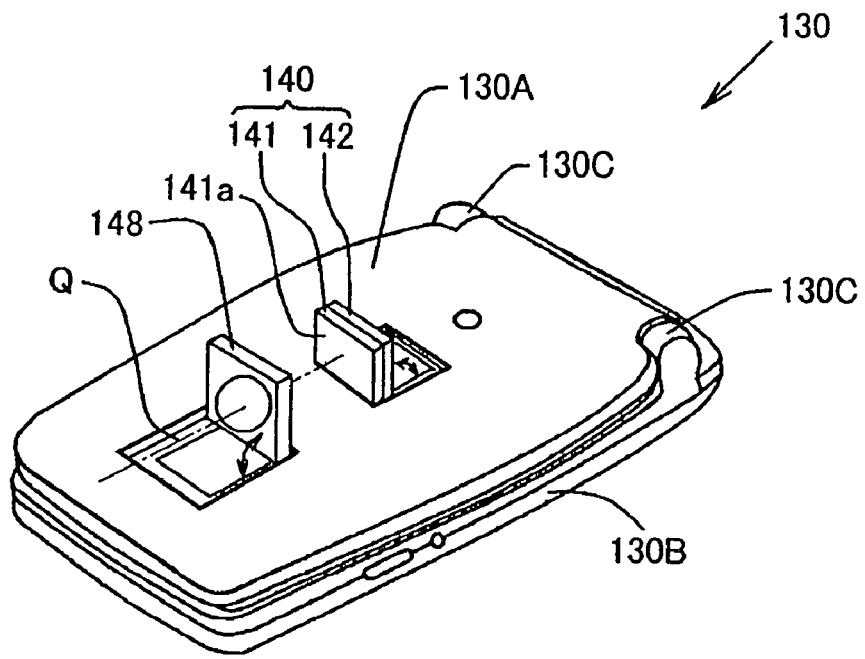
FIG. 14 is a perspective view of the mobile phone shown in FIG. 13, showing a state in that a liquid crystal display unit and a projector lens are raised.
Figure 15:
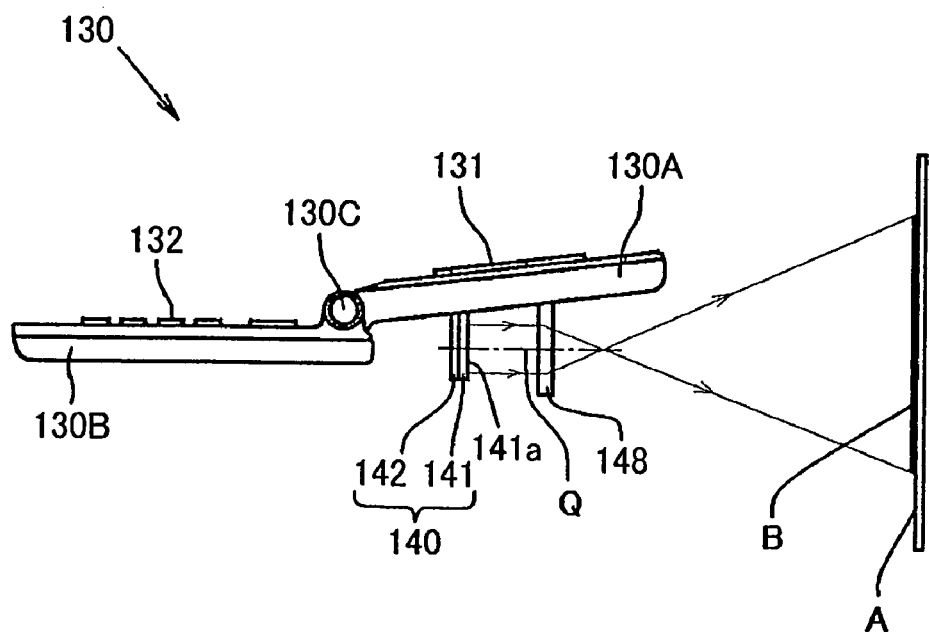
FIG. 15 is a side view of the mobile phone of FIG. 13 in a state in that image projection is performed.

As shown in FIG. 14, the liquid crystal display unit 140 is composed of a light-transmissive liquid crystal display panel 141 and a light source 142 for image projection so as to function as a light valve with a light source for image projection. Therefore, the mobile phone 130 according to the third embodiment has no light source provided separately from the liquid crystal display panel in contrast to the first and second embodiments. The light source may include an LED (light emitting diode) or an EL (electro-luminescence). In particular, recently, the LED has been improved in brightness, so that the LED may be favorably used for the thin liquid crystal display unit 140 because of its compactness. The light-transmissive liquid crystal display panel 141 has a high response speed and can be used in a field-sequential color method of producing color images. In the example shown in FIG. 16, the light source 142 is made by arranging an LED member 153, a prism sheet 154, and a reflective polarizing plate 155 in that order.

The LED member 153 comprises a plurality of LEDs each including three kinds of light-emitting elements of a red-color light-emitting element, a green-color light-emitting element, and a blue-color light-emitting element which are contained in one package. The light-emitting elements of the LED may be mounted on a reflection member and encapsulated by a resin containing a scattering material. When the three kinds of light-emitting elements are turned-on simultaneously, the emitted lights with different wavelengths are mixed within the package by the scattering material, and emitted from the LED as a white light.

Figure 16:
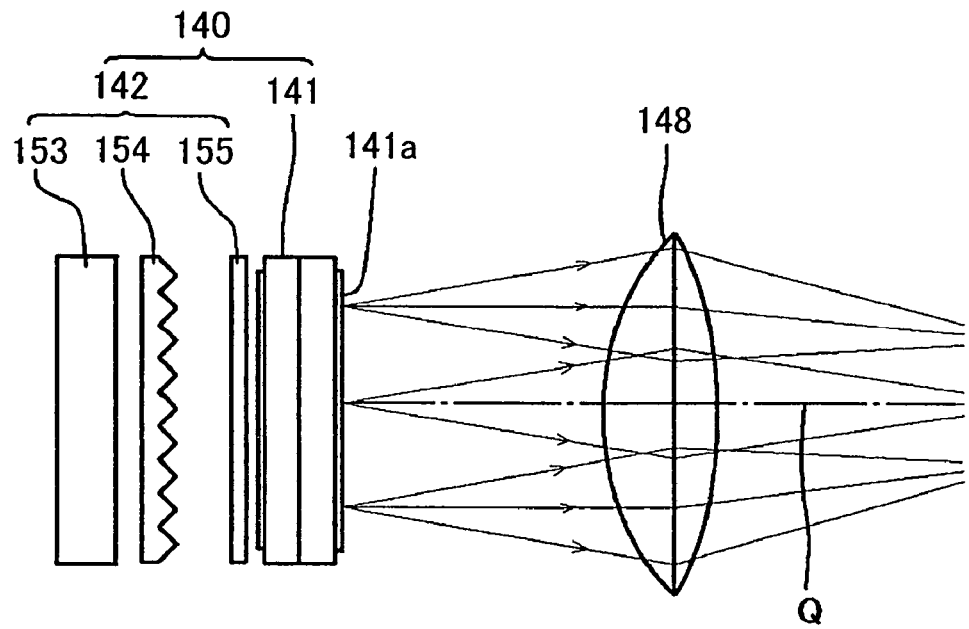
FIG. 16 is an exploded view of component parts of the liquid crystal display unit of the third embodiment.
Figure 17:
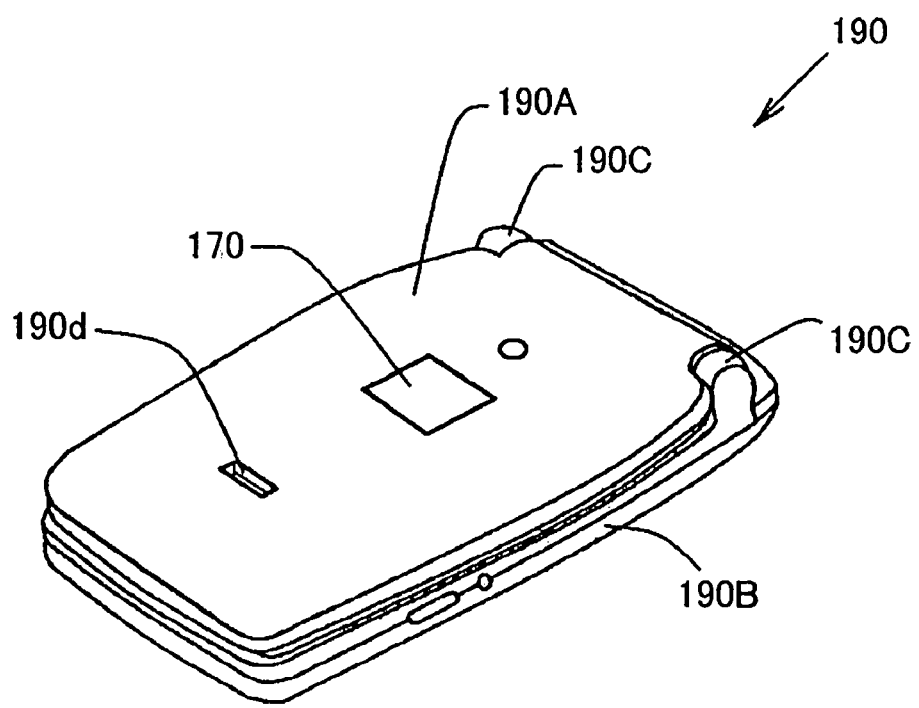
FIG. 17 is a perspective view of a mobile phone according to a fourth embodiment of the present invention which is in a folded state.
Figure 18:
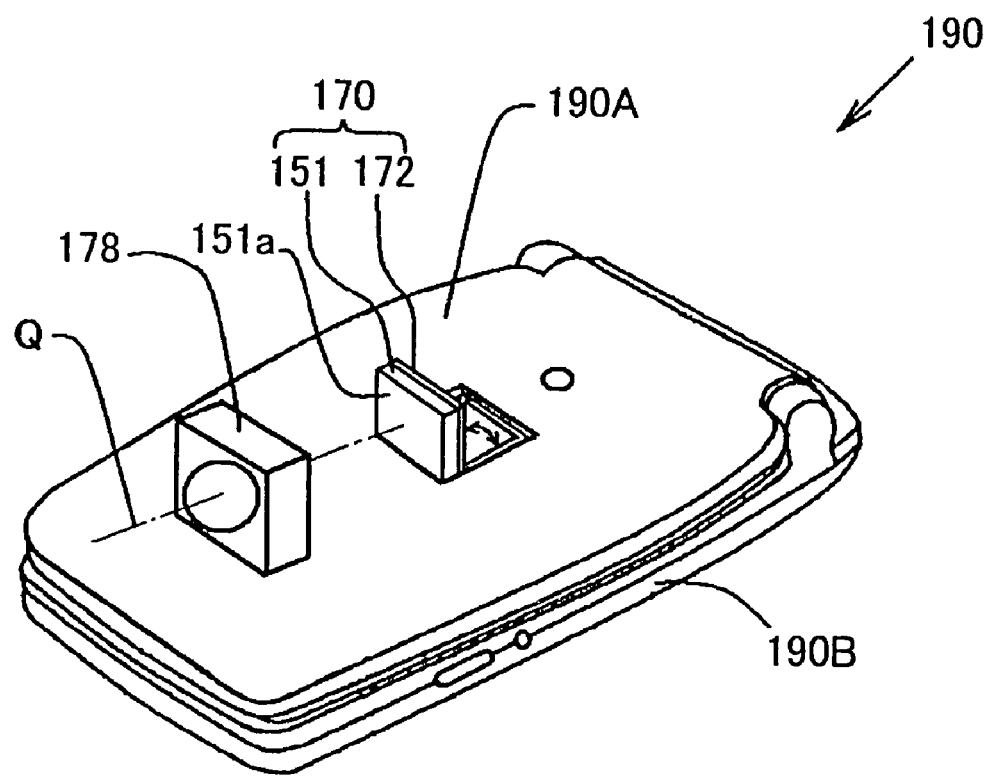
FIG. 18 is a perspective view of the mobile phone of FIG. 17, showing a state in that a liquid crystal display unit is raised and a projector lens is mounted.
Figure 19:
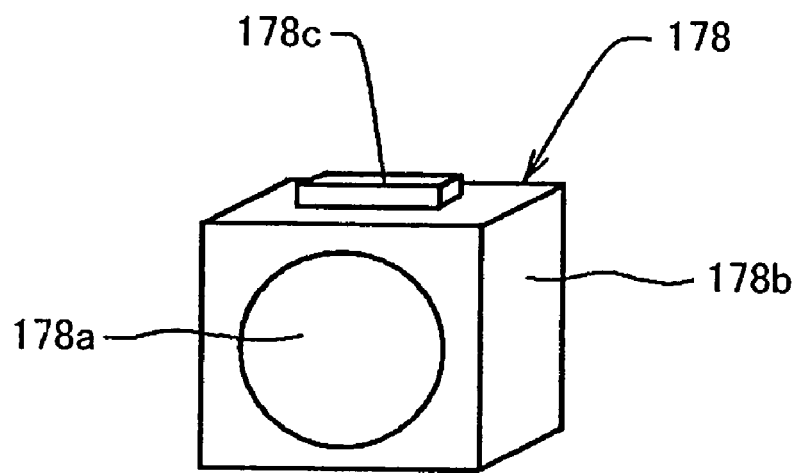
FIG. 19 is a perspective view of the projector lens of the mobile phone according to the fourth embodiment.
Figure 20:
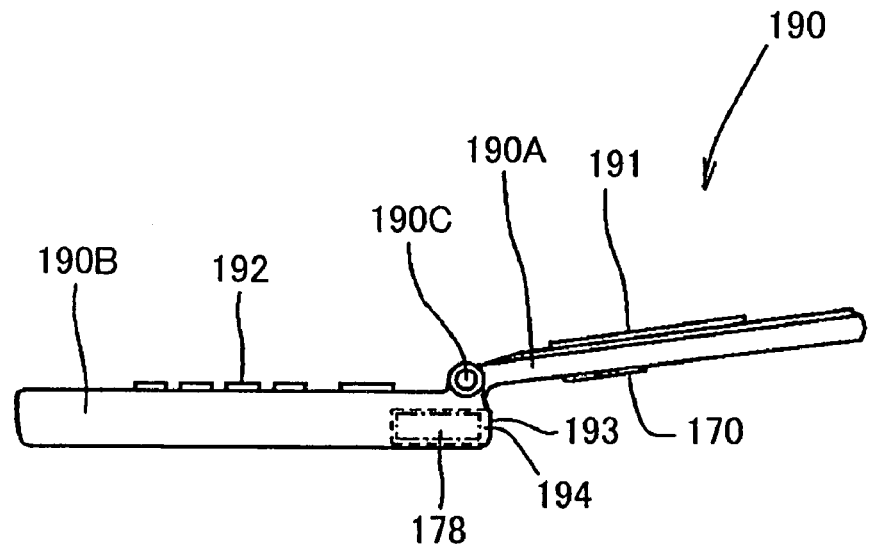
FIG. 20 is a side view of the mobile phone according to the fourth embodiment with the projector lens put in the casing of the mobile phone.

The prism sheet 154 comprises a plurality of fine prisms which are disposed as juxtaposed columns, and has a thickness of about 0.1 mm. The prism sheet 154 increases the parallelism of the light from the LED so as to increase the intensity of illumination. In FIG. 16, shapes are exaggerated for easy understanding.

The reflective polarizing plate 155 has a reflection axis and a transmission axis perpendicular to the reflection axis so as to reflect the linearly polarized component light with a vibration plane parallel with the reflection axis as well as to transmit the linearly polarized component light with a vibration plane parallel with the transmission axis. The reflective polarizing plate with such a specification may include DBEF™ supplied by Sumitomo 3M co., and has a thickness of about 0.1 mm.

The light entering surface of the light-transmissive liquid crystal display panel 141 is provided with a polarizing plate. The polarizing plate includes a transmission axis and an absorption axis so as to transmit the linearly polarized component light with a vibration plane parallel with the transmission axis as well as to absorb the linearly polarized component light with a vibration plane parallel with the absorption axis. The transmission axis of the polarizing plate is aligned to the transmission axis of the reflective polarizing plate 155.

The light emitted from the LED member 153 passes through the prism sheet 154, and then proceeds toward the reflective polarizing plate 155. The light from the LED 153 is a random polarized light and the linearly polarized component light thereof having a vibration plane parallel with the transmission axis of the reflective polarizing plate 155 passes through the reflective polarizing plate 155 and then enters the light-transmissive liquid crystal display panel 141. Polarized component light reflected by the reflective polarizing plate 155 is again reflected by the reflection member of the LED member 153 and directed toward the light-transmissive liquid crystal display panel 141 again. At this time, the light reflected from the LED member 153 becomes a random polarized light due to the scattering material of the LED so as to produce the polarized component transmissive through the reflective polarizing plate 155. By repeating this process, the amount of light arriving at the light-transmissive liquid crystal display panel 141 is increased, improving the light economic efficiency.

It is possible to form a full color image by sequentially and repeatedly turned on and off the light-emitting elements R, G, and B of the LED member 153 and synchronously driving the pixels of the light-transmissive liquid crystal display panel 141. The color image forming method referred as field-sequential color method does not use color filters and therefore the light transmittance is improved and a bright image can be formed.

FIGS. 17 to 21 show a mobile phone 90 according to a fourth embodiment of the present invention.

The mobile phone 90 is generally the same in structure as the mobile phone 30 according to the second embodiment, and includes first and second casings 190A and 190B connected together via a hinge 190C and a liquid crystal display unit 170 pivotally attached to the second casing 190B. The first casing 190A is formed with a mounting hole 190d for detachably mounting a projector lens 178 on the first casing by fitting a projection 178c of the projector lens 178 into the hole. These component elements are substantially the same in fundamental function as those in the second embodiment. Hence, only the features peculiar to the fourth embodiment will be described herein and others are omitted.

According to the fourth embodiment, when the projector lens 178 is removed from the first casing 190A, it can be put in a storage part 194 provided within the second casing 190B in the vicinity of the hinge 190c. The storage part 194 is provided with an insertion slot formed in an end face 193 of the second casing 190B. The projector lens 178 is inserted into the storage part 194 from the insertion slot. A battery, which is generally bulky, may also be accommodated within the same casing where the storage part 194 is provided.

Figure 21:
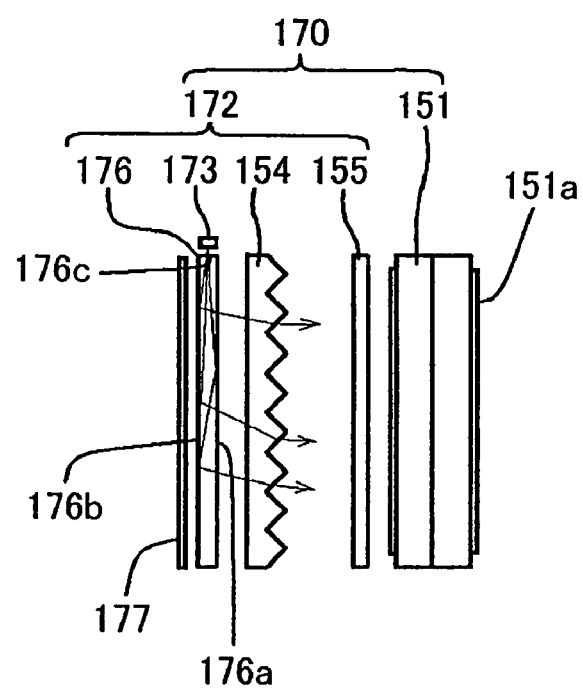
FIG. 21 is an exploded view of component parts of the liquid crystal display unit in the mobile phone according to the fourth embodiment.

The liquid crystal display unit 170 has generally the same structure as that of the liquid crystal display unit 140 according to the third embodiment. A light source 172, as shown in FIG. 21, includes the reflective polarizing plate 155, the prism sheet 154, an LED member 173, a light guide plate 176, and a reflection sheet 177. The reflective polarizing plate 155 and the prism sheet 154 are the same as those of the third embodiment.

The LED member 173 includes three kinds of LEDs of a red-color LED, a green-color LED, and a blue-color LED. The required number of the LEDs 173 is arranged adjacent to the light receiving surface 176c of the light guide plate 176. Like in the first embodiment, a plurality of LEDs each containing the three-kind light emitting elements in a package, may be alternatively used.

The light guide plate 176 receives the light of the LEDs 173 from the light receiving surface 176c and emit the light toward the prism sheet 154 from the light exiting surface 176a. The reflection sheet 177 is provided adjacent to a surface 176b opposite to the light exiting surface 176a, so that the light exiting surface 176b is reflected by the reflection sheet 177 so as to emit the reflected light from the light exiting surface 176a. The light guide plate 176 is made of a transparent resin such as an acrylic resin or a polycarbonate resin. The reflection sheet 177 is made of a material of a good reflectance having diffusion or birefringence characteristics.

The prism sheet 154 improves the parallelism of the light emitted from the light source 172 to thereby increase brightness of the light relative to the liquid crystal display panel. The light guide plate 176 controls the light emitted from the light source 172 so that the light enters the prism sheet 154 at the most suitable angle to contribute to the improvement in the parallelism and brightness of the light emitted from the light source 172. The light source 172 including the light guide plate 176 guides the light from the LEDs 173 so as to emit the light from the entire region of the light exiting surface 176a, so that the emitted light with high uniformity in brightness can be obtained. Further, recently, a light guide plate with a thickness of less than 0.5 mm has been put in practical use and, thus, it is possible to further reduce the thickness of the unit 170 comprising the light source 172 and the liquid crystal display 151. The light emitted from the LEDs 173 is a random polarized light, and it is transmitted to a light-transmissive liquid crystal display panel 151 in the same way as in the third embodiment.

According to both the third and fourth embodiments, the light-transmissive liquid crystal display panel 151 is driven by the field-sequential color method to form color images. Alternatively, when the light source is sufficiently bright, color filters can be used to form color images.

Figure 22:
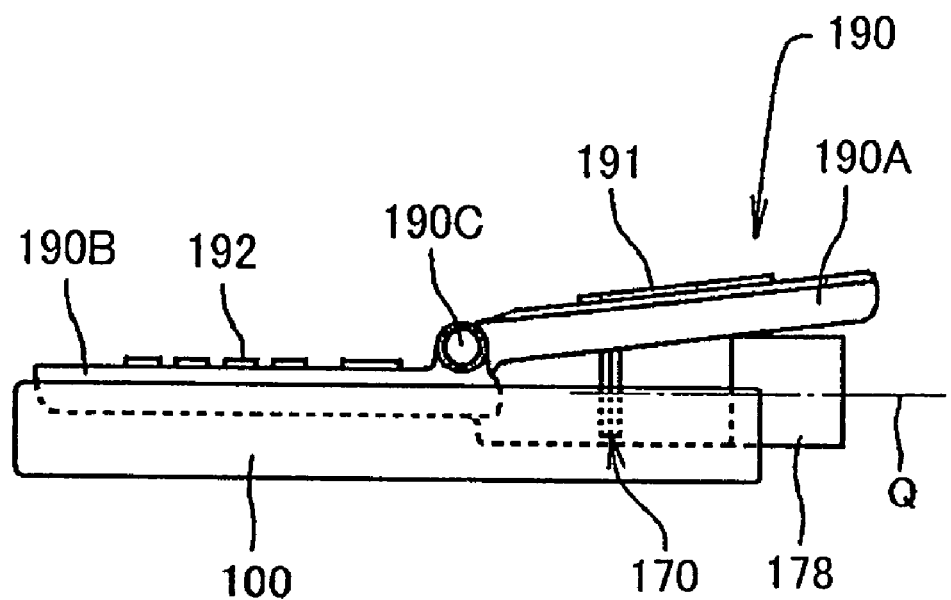
FIG. 22 is a side view of the mobile phone according to the fourth embodiment in a state in that the mobile phone is mounted on a mobile-phone battery charger.
Figure 23:
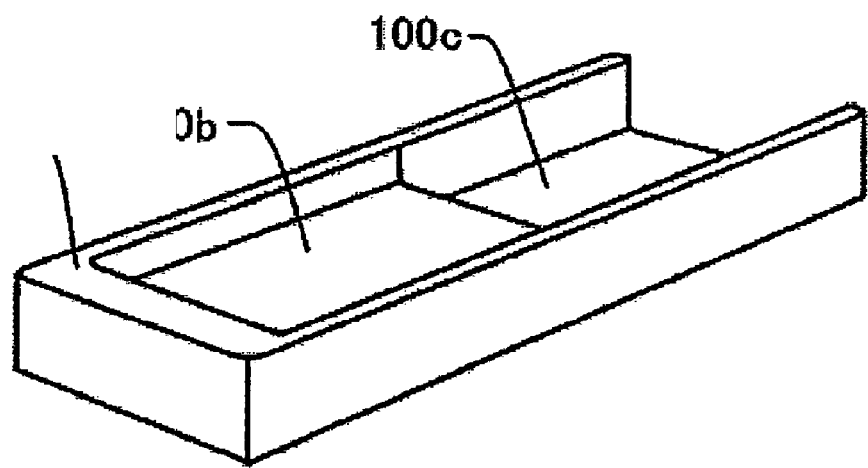
FIG. 23 is a perspective view of the mobile-phone battery charger shown in FIG. 22.

FIGS. 21 and 22 show a battery charger 100 of the mobile phone according to the third embodiment. The battery charger 100 is substantially the same in structure and function as that shown in FIGS. 9 and 10, so that its detailed description is omitted.

Figure 24:
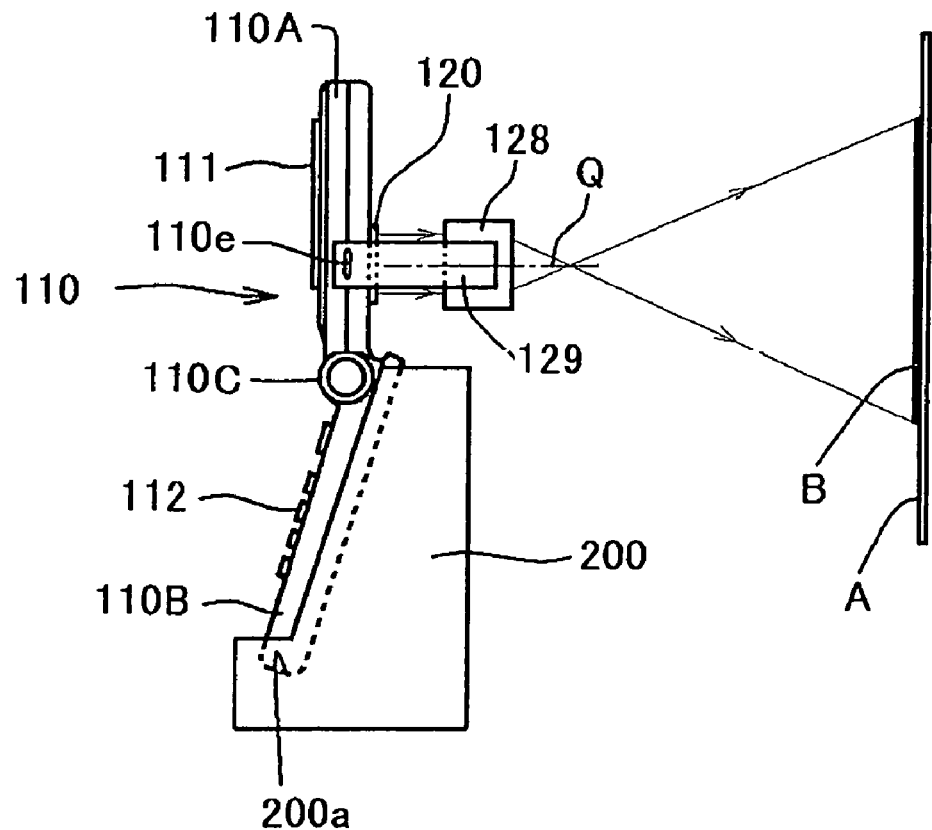
FIG. 24 is a side view of a mobile phone according to a fifth embodiment of the present invention in a state in that the mobile phone is mounted on a mobile-phone battery charger.

FIG. 24 shows a mobile phone 110 according to a fifth embodiment of the present invention.

Like the embodiments described above, the mobile phone 110 includes first and second casings 110A and 110B connected together via a hinge 110C. The second casing 110B is provided with a main liquid crystal display panel 111 and a liquid crystal display unit 120 while the first casing 110A is provided with an operation panel 112.

A projector lens 128 is, like the lens shown in FIG. 7, comprises a plurality of lenses accommodated within a lens barrel to adjust the angle of view and focus. The lens barrel of the projector lens 128 is provided with mounting arms 129 which have distal ends adapted to be securely connected to mounting parts 110e formed on the sides of the mobile phone 110. The projector lens 128 is fixed on the front face of the liquid crystal display unit 120 so that the light axis Q of the projector lens 12 intersects the display surface of the liquid crystal display unit 120 at a substantially right angle.

A mobile-phone battery charger 200 is an upright type in that the mobile phone 110 is mounted in an upright state. The second casing 110B of the mobile phone is fixed to the mobile-phone battery charger 200 by being inserted into a recess 200a of the mobile-phone battery charger 200.

The image projection method is the same as that of the embodiment shown FIG. 22, and an image displayed on the liquid crystal display unit 120 is enlarged and projected through the projector lens 128 on a screen to form an image B. Since the screen is positioned in front of an operator and the operation panel is also located in front of the operator, the image projection operation is easy.

Figure 27:
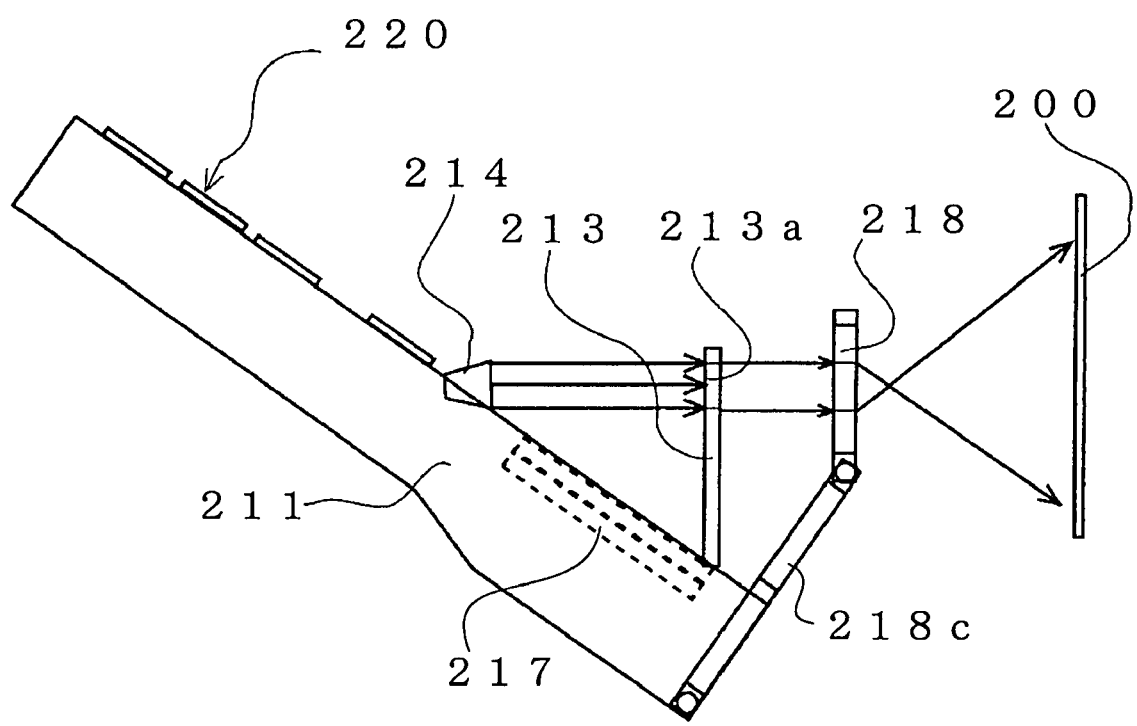
FIG. 27 is a side view of the mobile phone of FIG. 26, showing a state of image projection operation.

FIGS. 26 to 27 show a mobile phone according to a sixth embodiment.

A mobile phone body 211 of this mobile phone is not foldable differently from those of the embodiments described above. A light-transmissive liquid crystal display panel 213 and a light source 214 are movable between the normal position shown in FIG. 26 and the raised position shown in FIG. 27. A projector lens 218 is connected to the mobile phone body 211 via collapsible connection arms 18. The projector lens 218 is arranged movably between the normal position shown in FIG. 26 and the extended and raised position shown in FIG. 27 wherein the projector lens 218 opposes to the raised light-transmissive liquid crystal display panel 213. Reference numeral 200 denotes a backlight for the light-transmissive liquid crystal display panel 213 and numeral 220 denotes an operation panel.

What is claimed is:

1. A mobile phone comprising:
   a mobile phone body; and
   image projecting means provided in the mobile phone body, the image projecting means including:
      a light-transmissive liquid crystal display panel displaceably attached to the mobile phone body and being displaceable to a light-transmissive liquid crystal display panel's raised position where the light-transmissive liquid crystal display panel is raised from a surface of the mobile phone body;
      a light source for emitting light to illuminate the light-transmissive liquid crystal display panel that is positioned at the light-transmissive liquid crystal display panel's raised position; and
      a projector lens raised from the surface of the mobile phone body and positioned at a projector lens's raised position to oppose a display surface of the light-transmissive liquid crystal display panel that is positioned at the light-transmissive liquid crystal display panel's raised position so as to perform an image projection by letting the light emitted from the light source pass through the light-transmissive liquid crystal display panel and the projector lens.

2. The mobile phone according to claim 1, wherein a light axis of the projector lens is arranged substantially perpendicularly to the display surface of the light-transmissive liquid crystal display panel that is positioned at the light-transmissive liquid crystal display panel's raised position.

3. The mobile phone according to claim 1, wherein a light axis of the light source is arranged substantially perpendicularly to the display surface of the light-transmissive liquid crystal display panel that is positioned at the light-transmissive liquid crystal display panel's raised position.

4. The mobile phone according to claim 1, wherein the projector lens is attached to the surface of the mobile phone body and movable to the projector lens's raised position and the light source is attached to the surface of the mobile phone body and movable to a light source's raised position with light axes of the projector lens and the light source substantially aligned with each other at the respective raised positions.

5. The mobile phone according to claim 1, wherein the projector lens is displaceable between a normal position in that the projector lens is put within the surface of the mobile phone and the projector lens's raised position.

6. The mobile phone according to claim 1, wherein the projector lens is detachably attached to the mobile phone body.

7. The mobile phone according to claim 1, wherein the projector lens comprises a plurality of lenses.

8. The mobile phone according to claim 1, wherein the projector lens has at least one of a focusing function and a field-angle adjusting function.

9. The mobile phone according to claim 6, wherein the mobile phone body is provided with a storage part for accommodating the projector lens detached from the mobile phone body.

10. The mobile phone according to claim 1, wherein the light source comprises at least one light-emitting diode.

11. The mobile phone according to claim 10, wherein the light-emitting diode comprises a red-color light-emitting diode element, a green-color light-emitting diode element, and a blue-color light-emitting diode element.

12. The mobile phone according to claim 10, wherein the light emitting diode comprises a package containing a red-color light-emitting diode element, a green-color light-emitting diode element, and a blue-color light-emitting diode element.

13. The mobile phone according to claim 1, wherein the light source comprises at least one light-emitting diode, and when red-color light, green-color light, and blue-color light are sequentially emitted from the light-emitting diode, the light-transmissive liquid crystal display panel is synchronously operated so as to project multi-color images from the display surface of the light-transmissive liquid crystal display panel.

14. The mobile phone according to claim 1, wherein the mobile phone is adapted to be supplied with electric driving power for the light source from a mobile phone battery charger.

15. The mobile phone according to claim 14, wherein the mobile phone body is detachably mountable on the mobile phone battery charger.

16. The mobile phone according to claim 1, wherein the light-transmissive liquid crystal display panel is movable between a normal position where the light-transmissive liquid crystal display panel is used at the surface of the mobile phone body to display an information in a normal use of the mobile phone and the light-transmissive liquid crystal display panel's raised position to perform the image projection.

17. The mobile phone according to claim 1, wherein the mobile phone body comprises a first casing having first and second opposite surfaces and the light-transmissive liquid crystal display panel is movable between a normal position where the light-transmissive liquid crystal display panel is put within the first surface of the first casing and the light-transmissive liquid crystal panel's raised position where the light-transmissive liquid crystal display panel is raised from the first surface at a predetermined angle, and
   wherein the projector lens is attached on the first surface of the first casing so that a light axis of the projector lens positioned at the lens's raised position is normal to the display surface of the light-transmissive liquid crystal display panel that is positioned at the light-transmissive liquid crystal display panel's raised position.

18. The mobile phone according to claim 17, wherein the projector lens is movable between a normal position where the projector lens is held in parallel with the first surface within the first surface of the first casing and the projector lens's raised position wherein the projector lens is raised from the first surface of the first casing at a predetermined angle.

19. The mobile phone according to claim 1, wherein the light source is positioned at the surface of the mobile shone bod and the surface is the same surface at which the light-transmissive liquid crystal display panel is disposed with a space between the light source and the light-transmissive liquid crystal display panel.

20. The mobile phone according to claim 19, wherein the light source includes a light-emitting diode, a prism sheet, and a reflective polarizing plate, which are disposed successively in a direction toward the light-transmissive liquid crystal display panel along a light axis of the projector lens, and
wherein the light source is in contact with and combined with the light-transmissive liquid crystal display panel to form a light source and display panel unit.

21. The mobile phone according to claim 20, wherein the light source of the light source and display panel unit is positioned adjacent to a periphery of the light guide plate.

22. The mobile phone according to claim 21, wherein the light source and display panel unit is movable between a normal position where the light source and display panel unit is held within the surface of the mobile phone body and a raised position where the light source and display panel unit is raised from the surface of the mobile phone body at a predetermined angle.

23. The mobile phone according to claim 1, wherein the mobile phone body comprises a first casing having first and second opposite surfaces and a second casing connected to the first casing with a hinge, the first casing being pivotable between a folded position where the second surface of the first casing is in contact with a surface of the second casing and an unfolded position where the first casing is pivotably moved relative to the second casing to extend in a longitudinal direction of the second casing, and
wherein the second casing has an end positioned adjacent to the hinge, and the light source is disposed at the end so as to illuminate the light-transmissive liquid crystal display panel that is positioned at the light-transmissive liquid crystal display panel's raised position on the first surface of the first casing with a light axis of the light source perpendicular to the light-transmissive liquid crystal display panel at the unfolded position.

24. The mobile phone according to claim 1, wherein the mobile phone body comprises a first casing having first and second opposite surfaces, and the first casing is provided with a main liquid crystal display panel on the second surface of the first casing for displaying information about the mobile phone, and wherein the light-transmissive liquid crystal display panel and the projector lens are arranged on the first surface of the first casing.

25. The mobile phone according to claim 1, wherein the mobile phone body comprises a first casing having first and second opposite surfaces and a second casing connected to the first casing with a hinge, the first casing being pivotable between a folded position where the second surface of the first casing is in contact with a surface of the second casing and an unfolded position where the first casing is pivotably moved relative to the second casing to extend in a longitudinal direction of the second casing,
wherein the first casing is provided with a main liquid crystal display panel on the second surface of the first casing for displaying information about the mobile phone, and a sub liquid crystal display panel for displaying information about the mobile phone on the first surface of the first casing,
the second casing is provided with an operation panel arranged on a surface that the second surface of the first casing is brought into contact with when the first casing is located at the folded position, and
the sub liquid crystal display panel serves as the light-transmissive liquid crystal display panel of the image projecting means.

26. The mobile phone according to claim 1, wherein the light emitted from the light source is a substantially collimated light and substantially perpendicularly enters the light-transmissive liquid crystal display panel.

27. The mobile phone according to claim 1,
wherein the projector lens is detachably mountable on the surface of the mobile phone body and comprises a plurality of lenses for enabling at least one of a focusing function and a field-angle adjusting function.

* * * * *

UNITED STATES PATENT AND TRADEMARK OFFICE
CERTIFICATE OF CORRECTION

| | | |
|---|---|---|
| PATENT NO. | : 7,862,185 B2 | Page 1 of 1 |
| APPLICATION NO. | : 11/731804 | |
| DATED | : January 4, 2011 | |
| INVENTOR(S) | : Koya Noba | |

It is certified that error appears in the above-identified patent and that said Letters Patent is hereby corrected as shown below:

<u>In the Claims</u>

In column 15, claim 19, lines 4-5, after "surface of the mobile" replace "shone bod and" with --phone body, and--.

In column 15, claim 21, line 18, after "light source" delete "of the light source".

Signed and Sealed this
Twelfth Day of April, 2011

David J. Kappos
*Director of the United States Patent and Trademark Office*